United States Patent

Reckzeh et al.

(10) Patent No.: US 8,336,829 B2
(45) Date of Patent: Dec. 25, 2012

(54) ADVANCED TRAILING EDGE CONTROL SURFACE ON THE WING OF AN AIRCRAFT

(75) Inventors: Daniel Reckzeh, Stuhr (DE); Bernhard Schlipf, Bremen (DE); Luc Andreani, Bremen (DE); Mark Sutcliffe, Bremen (DE)

(73) Assignee: Airbus Operations GmbH (DE)

( * ) Notice: Subject to any disclaimer, the term of this patent is extended or adjusted under 35 U.S.C. 154(b) by 783 days.

(21) Appl. No.: 11/992,495

(22) PCT Filed: Sep. 18, 2006

(86) PCT No.: PCT/EP2006/009067
§ 371 (c)(1),
(2), (4) Date: Sep. 3, 2009

(87) PCT Pub. No.: WO2007/054150
PCT Pub. Date: May 18, 2007

(65) Prior Publication Data
US 2010/0006707 A1    Jan. 14, 2010

(30) Foreign Application Priority Data
Sep. 23, 2005 (DE) .......................... 10 2005 045 759

(51) Int. Cl.
*B64C 9/16* (2006.01)
(52) U.S. Cl. ........ 244/216; 244/213; 244/215; 244/217; 244/212
(58) Field of Classification Search ................. 244/198, 244/204, 211, 212, 213, 215, 216, 99.9, 99.1, 244/99.2, 210, 214, 217
See application file for complete search history.

(56) References Cited

U.S. PATENT DOCUMENTS

| 2,117,607 A | 5/1938 | Griswold |
| 2,169,416 A | 8/1939 | Griswold |

(Continued)

FOREIGN PATENT DOCUMENTS
DE    1 506 615    8/1969
(Continued)

OTHER PUBLICATIONS

Office Action from Japanese Application No. 2008-531594, dated Sep. 12, 2011.

*Primary Examiner* — Isam Alsomiri
*Assistant Examiner* — Justin Benedik
(74) *Attorney, Agent, or Firm* — Lerner, David, Littenberg, Krumholz & Mentlik, LLP (57) ABSTRACT

An aircraft wing trailing edge control surface including a trailing edge flap adjustable to different positions, a sealing flap on the upper side between the wing and the flap, and a ventilation flap on the underside between the wing and the flap. The flap is adjustable downward through positive positions and upward through negative positions. The wing profile is closed on the upper side by the sealing flap and the underside by the ventilation flap when the flap is used as a control flap and adjusted between negative and low positive positions. The ventilation flap releases air flow from the wing underside to the upper side of the flap and the sealing flap is retracted to release an outflow of air from the upper side of the flap when the flap is used for increasing lift and the flap is adjusted between low and high positive positions.

29 Claims, 4 Drawing Sheets

U.S. PATENT DOCUMENTS

| | | | |
|---|---|---|---|
| 2,261,363 A | | 11/1941 | Griswold |
| 2,276,522 A | | 3/1942 | Staufer |
| 2,635,837 A | | 4/1953 | Grant |
| 2,772,058 A | | 11/1956 | Charles |
| 2,836,380 A | | 5/1958 | Pearson |
| 2,920,844 A | * | 1/1960 | Marshall et al. ............... 244/207 |
| 3,583,660 A | * | 6/1971 | Hurkamp et al. ............. 244/207 |
| 3,677,504 A | | 7/1972 | Schwarzler |
| 3,767,140 A | * | 10/1973 | Johnson ........................ 244/216 |
| 3,874,617 A | * | 4/1975 | Johnson ........................ 244/216 |
| 3,921,942 A | | 11/1975 | Bracka |
| 4,015,787 A | * | 4/1977 | Maieli et al. .................. 244/215 |
| 4,120,470 A | * | 10/1978 | Whitener ....................... 244/213 |
| 4,395,008 A | | 7/1983 | Sharrock et al. |
| 4,471,927 A | | 9/1984 | Rudolph et al. |
| 4,720,066 A | * | 1/1988 | Renken et al. ................. 244/213 |
| 4,962,902 A | | 10/1990 | Fortes |
| 5,207,400 A | * | 5/1993 | Jennings ....................... 244/216 |
| 5,735,485 A | * | 4/1998 | Ciprian et al. ................ 244/113 |
| 6,076,775 A | | 6/2000 | Bauer |
| 6,565,045 B1 | | 5/2003 | Correge et al. |
| 6,601,801 B1 | | 8/2003 | Prow et al. |
| 7,243,881 B2 | * | 7/2007 | Sakurai et al. ................. 244/212 |
| 7,891,611 B2 | * | 2/2011 | Huynh et al. .................. 244/215 |
| 2005/0011994 A1 | * | 1/2005 | Sakurai et al. ................. 244/212 |
| 2005/0061922 A1 | * | 3/2005 | Milliere ........................ 244/213 |

FOREIGN PATENT DOCUMENTS

| | | |
|---|---|---|
| DE | 1 943 680 | 3/1971 |
| DE | 198 03 421 A1 | 9/1998 |
| DE | 197 32 953 C1 | 3/1999 |
| DE | 600 02 851 T2 | 3/2004 |
| FR | 846 337 | 9/1939 |
| GB | 176909 | 3/1922 |
| GB | 1 602 905 | 11/1981 |
| JP | 57194192 A | 11/1982 |
| JP | 59128098 A | 7/1984 |
| JP | 06032291 A | 2/1994 |
| RU | 2214347 C2 | 10/2003 |
| WO | 9100824 A1 | 1/1991 |
| WO | 9105699 A1 | 5/1991 |
| WO | 2006084157 A2 | 8/2006 |

* cited by examiner

ADVANCED TRAILING EDGE CONTROL SURFACE ON THE WING OF AN AIRCRAFT

CROSS-REFERENCE TO RELATED APPLICATIONS

The present application is a national stage application under 35 U.S.C. §371 of International Application No. PCT/EP2006/009067, filed Sep. 18, 2006, published in German, which claims the priority of German Patent Application No. 10 2005 045 759.2 filed on Sep. 23, 2005, the contents of which are incorporated herein by reference.

FIELD OF THE INVENTION

The present invention relates to an advanced trailing edge control surface on the wing of an aircraft.

BACKGROUND OF THE INVENTION

The described device is most sensibly referred to as an advanced trailing edge control surface (ATECS—Advanced Trailing Edge Control Surface) because it has a significantly broader spectrum of applications than the basic mechanical principle of a simple slotted flap due to its kinematics and novel multi-functional control surfaces.

The state of the art includes a large number of trailing wing flap systems, an excerpt of which is initially described below in the form of the representatives most relevant to the present invention. The most relevant representatives of these systems are primarily single-gap flap systems. These flap systems are used as primary as well as secondary flight control and in the form of combined control surfaces. Furthermore, these representatives may be used for roll control, pitch control and for increasing the lift. The two latter-mentioned patents show exemplary options for realizing an adaptive wing that is not designed for an/one "optimal" operating point only.

The simple slotted flap, in principle, consists of a simple hinged support that is defined in space by a pivoting axis. Advantageous technical effects can be achieved if the pivoting axis lies far below the wing profile (U.S. Pat. No. 4,120, 470):

The wing surface and the wing curvature are increased when the flap is extended (positive flap value positions) such that the lift increases significantly.

The flap or the control surface is moved into the high-energy air flow such that the lift is additionally increased.

However, a few disadvantageous technical effects occur:

Negative flap value positions are typically not possible because the nose edge of the flap diverges from the enveloping geometry of the wing on the profile underside and significant structural space conflicts arise in the rear spar region of the wing (depending on the position of the pivotal point).

Convergent/divergent air flows with the associated loss of lift and significantly increased drag frequently occur in the gap air flow.

An aerodynamic fairing of the mechanical flap system which lies in the air flow is required, but additional aerodynamic drag is created in this case.

If the pivoting axis lies near the nose edge of the flap (U.S. Pat. No. 2,117,607, U.S. Pat. No. 2,169,416, U.S. Pat. No. 2,276,522, U.S. Pat. No. 2,836,380, U.S. Pat. No. 2,920,844, U.S. Pat. No. 4,015,787, U.S. Pat. No. 4,395,008, U.S. Pat. No. 4,471,927, U.S. Pat. No. 4,962,902, DE1943680, DE19803421A1, FR846337, U.S. Pat. No. 6,601,801), the following advantageous technical effects can be achieved:

Positive and negative flap value positions can be realized with simpler constructions.

This is decisive for primary control surfaces because they typically need to assume positive and negative value positions (elevators/ailerons/rudders). Secondary control surfaces primarily operate as high-lift components of an aircraft and, as such, usually only have one preferred effective direction.

However, this position of the pivotal point results in one decisive disadvantage: the high-energy air flow can no longer flow around the flap. The high-energy air flow around the wing underside has the advantageous technical effect of decisively improving the separation characteristics of the entire wing. This problem is eliminated with a ventilation flap that lies underneath the wing (U.S. Pat. No. 2,117,607). Due to the lower ventilation flap, the high-energy air flow can also flow around a flap with a pivotal point near the leading wing edge. The lower ventilation flap is closed while cruising such that the overall wing profile ensures minimal aerodynamic drag.

The lower ventilation flap of the cited patents is usually designed for positive flap value positions only (U.S. Pat. No. 2,117,607, U.S. Pat. No. 2,169,416). The mechanical connection between the lower ventilation flap and the flap is either realized with a mechanical geared coupling or with an additional drive.

Other known flap systems (U.S. Pat. No. 6,601,801) feature a lower ventilation flap that is also suitable for negative flap value positions. However, the mechanical system used is relatively complex and comprises a large number of components.

Another known flap system (DE1943680) features a lower and an upper ventilation flap that are suitable for positive and negative flap value positions. One decisive disadvantage of this concept is that the ventilation flaps diverge from the external wing profile contour (drag, noise). This system consists of a symmetric construction that is prone to jamming and utilizes the advantageous technical effect of the gap in both directions.

Many known flap systems have relatively complex kinematic systems and consist of a large number of components (U.S. Pat. No. 2,276,522, U.S. Pat. No. 2,836,380, U.S. Pat. No. 2,920,844), wherein cam mechanisms that are prone to jamming are also used (U.S. Pat. No. 2,836,380, DE1943680, DE19803421 A1). In addition, spring elements (energy storage elements) are used that, in turn, generate higher driving loads (U.S. Pat. No. 2,169,416, U.S. Pat. No. 6,601,801). Flexible structures for larger covered surfaces can only fulfill the strict aerodynamic tolerances conditionally (U.S. Pat. No. 4,395,008, U.S. Pat. No. 4,471,927).

Normal high-lift systems are designed for positive flap value positions only, wherein most systems are equipped with brake flaps on their upper side. The brake flaps are usually controlled by a separate drive (U.S. Pat. No. 4,120,470). Most concepts that are also suitable for negative flap value positions usually require an additional upper sealing flap on their upper side (flexible: U.S. Pat. No. 4,395,008, U.S. Pat. No. 4,471,927) or an upper ventilation flap (rigid: DE1943680) or spring-type seal (U.S. Pat. No. 6,601,801) in order to prevent a geometric collision with the upper wing contour. Until now, there exist no systems that simultaneously utilize the upper sealing flap as a brake flap in order to significantly reduce the number of control surfaces.

An adaptive wing typically requires additional complex systems that frequently collide with the existing primary and secondary control surfaces. Furthermore, additional drives, a large number of components, flexible structures and additional control circuits with the corresponding sensors are required. Two known systems are mentioned as examples of systems for adjusting the entire wing profile or profile pressure curve, respectively (DE19732953C1, DE 6000285172).

There may be a need to develop a trailing edge control surface, in which primary as well as secondary control surfaces are realized on the wing with a lower mechanical expenditure and with less weight.

BRIEF SUMMARY OF THE INVENTION

According to an exemplary embodiment an advanced trailing edge control surface on the wing of an aircraft comprises a wing, a flap that is arranged on the trailing edge of the wing, extends in the wingspan direction and can be adjusted to different flap value positions, a pivoted sealing flap that is arranged on the upper side between the wing and the flap and a pivoted ventilation flap that is arranged on the underside between the wing and the flap. According to the invention, the flap can be adjusted downward through positive flap value positions and upward through negative flap value positions, wherein the wing profile is closed on the upper side by the sealing flap and on the underside by the ventilation flap when the flap is used as a control flap and adjusted between negative and low positive flap value positions, and wherein the ventilation flap releases an air flow from the underside of the wing to the upper side of the flap and the sealing flap is retracted in order to form a predetermined gap and release an outflow of air from the upper side of the flap when the flap is used for increasing the lift and adjusted between low positive and high positive flap value positions.

According to an exemplary embodiment of the inventive advanced trailing edge control surface, it is proposed that the trailing end of the sealing flap can be pivoted upward in order to utilize the sealing flap as a brake flap.

According to another exemplary embodiment of the inventive advanced trailing edge control surface, it is proposed that the sealing flap is positively driven by the flap.

According to an exemplary embodiment of the invention, a flap guide mechanism is provided that contains a hinge arranged between the wing and the flap.

The pivotal point of the hinge preferably is positioned such that the flap does not diverge from the wing profile contour in negative flap value positions of the flap and a significant surface increase and curvature increase is achieved in positive flap value positions of the flap.

According to an exemplary embodiment of the invention, it is proposed that the drive for the flap guide mechanism consists of a linear push-element or prismatic joint, respectively that is coupled to the wing and to the flap.

The prismatic joint preferably contains an actuator.

The actuator may be operated hydraulically (hydraulic actuator) or mechanically (spindle drive).

According to an exemplary embodiment of the invention, it is proposed that the ventilation flap is positively driven by or mechanically gear-coupled with the flap.

According to an exemplary embodiment of the invention, a ventilation flap mechanism is provided, in which the ventilation flap is connected to the wing by a lever mechanism that is supported on stationary bearings and contains two levers.

According to an exemplary embodiment of the invention, a sealing flap mechanism is provided, in which the sealing flap is positively driven by the flap.

In the sealing flap mechanism, the sealing flap preferably is positively driven by the flap by a lever mechanism that is coupled to the flap at a second bearing near the stationary bearing and to the sealing flap by a third bearing near a fourth bearing.

The lever mechanism that connects the sealing flap to the flap and contains the coupling rod preferably forms a four-bar mechanism.

According to an exemplary embodiment of the invention, it is proposed that the fourth bearing participates in a movement of the sealing flap in the sense of a brake flap function.

According to another exemplary embodiment of the invention, another bearing is provided on the upper sealing flap and coupled to an actuator in order to actuate the sealing flap in the sense of a brake flap function.

The additional bearing is for example arranged on a common pivoting axis with the fourth bearing.

The sealing flap mechanism may be realized, in particular, such that a collision between the flap and the sealing flap is prevented between low positive flap angles and all negative flap angles of the flap and the sealing flap is sealed relative to the flap in the entire aforementioned range.

According to an exemplary embodiment of the invention, it is proposed that the upper sealing flap is lowered in order to produce a convergent aerodynamic gap by being turned about the fourth bearing at higher positive flap value positions of the flap, in which the flap acts as a lift-increasing component.

A functional dependence between the absolute brake flap value position of the upper sealing flap (referred to the stationary wing) and the flap value position angle of the flap is for example realized by a corresponding control in the flight control computer.

According to an exemplary embodiment of the invention, it is proposed that the actuator device provided for the brake flap function moves the element along a circular path about a bearing by the additional bearing such that the double hinge formed by the fourth hinge and the additional hinge also moves along this circular path.

The brake flap mechanism for example is largely decoupled from the upper sealing mechanism.

The brake flap mechanism may also be realized separately rather than being integrated into the kinematic system.

According to an exemplary embodiment of the invention, it is proposed that all bearings consist of simple hinges.

According to another exemplary embodiment of the invention, it is proposed that the construction essentially consists of rods and frameworks only.

According to an exemplary embodiment of the invention, three-dimensional kinematics are provided for a cylindrical movement of the flap.

According to another exemplary embodiment of the invention, three-dimensional kinematics are provided for a conical movement of the flap.

The advanced trailing edge control surface may serve as primary control surface.

The advanced trailing edge control surface may serve as secondary control surface.

The advanced trailing edge control surface may serve as adaptive wing component.

The inventive advanced trailing edge control surface may be advantageously intended for use on the trailing wing edge of modern commercial aircraft and transport aircraft with a high take-off weight.

The inventive advanced trailing edge control surface may be advantageously characterized by a low weight, by a high reliability, by a small number of components and by a structurally simple construction. The complex requirements with respect to an advanced trailing edge control surface concept were realized in the best fashion possible. In addition, the complete support structures and the kinematic system of a conventional high-lift system are eliminated. The aerodynamic fairing is significantly smaller in the advanced trailing edge control surface such that an economical advantage (reduced drag, lower fuel costs) will be achieved for the entire flight.

BRIEF DESCRIPTION OF THE DRAWINGS

An embodiment of the inventive advanced trailing edge control surface is described in greater detail below with reference to the figures.

The figures show exemplary embodiments of the invention as follows.

DETAILED DESCRIPTION

Figure 1:
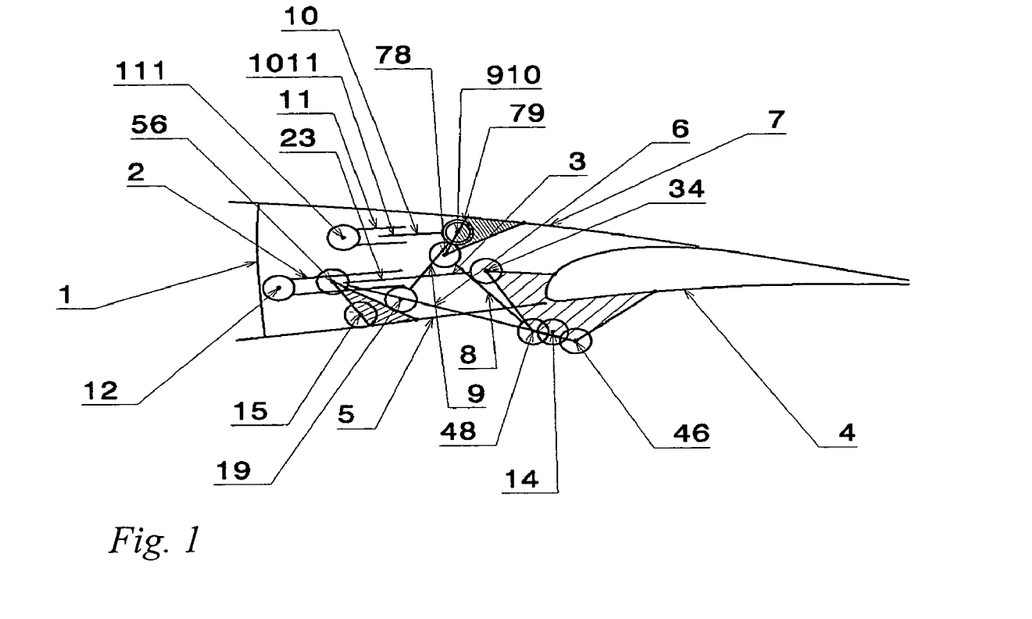
FIG. 1, a schematic sectioned side view of a complete advanced trailing edge control surface according to one embodiment of the invention.

The advanced trailing edge control surface on the wing of an aircraft is a schematically illustrated in its entirety in FIG. 1. The following nomenclature is used in order to understand the kinematic sketch. Individual kinematic elements are numbered continuously, and the connecting joints between two components are respectively identified by the two numbers of the respective elements (e.g.: element 1 and element 5 are connected by a hinge 15, with the other connecting elements being identified analogously). The advanced trailing edge control surface comprises a wing 1 and a flap 4 that is arranged on the trailing edge of the wing 1, extends in the wingspan direction and can be adjusted to different flap value positions, wherein said flap may act as a control flap as well as a lift-increasing flap. This flap is always simply referred to as "flap" below. However, a strict distinction between control surface (primary control surface) and high-lift component (secondary control surface) in the conventional sense is no longer appropriate in this case because both functions may transform into one another more and less seamlessly. A sealing flap 7 is arranged in a pivoted fashion on the upper side between the wing 1 and the flap 4, and a ventilation flap 5 is also arranged in a pivoted fashion on the underside between the wing 1 and the flap 4.

Figure 5:
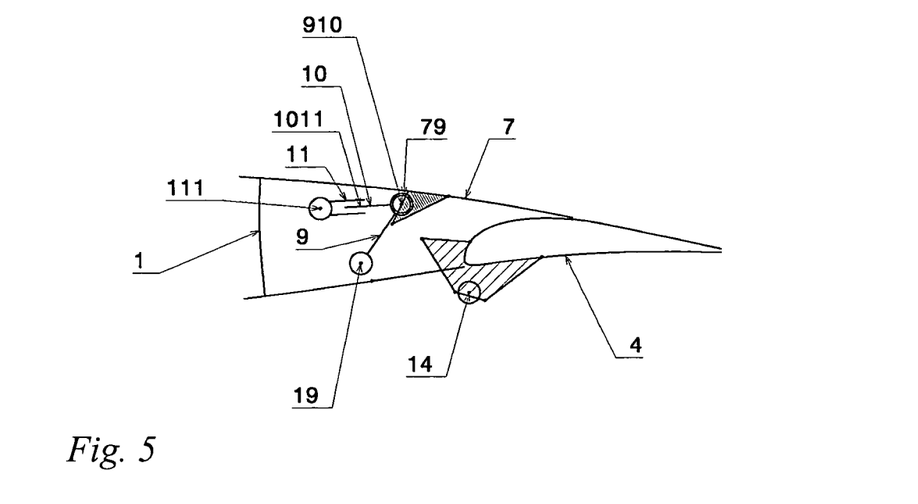
FIG. 5, a schematic sectioned side view of a brake flap mechanism contained in the advanced trailing edge control surface according to the embodiment of the invention.
Figure 6A:
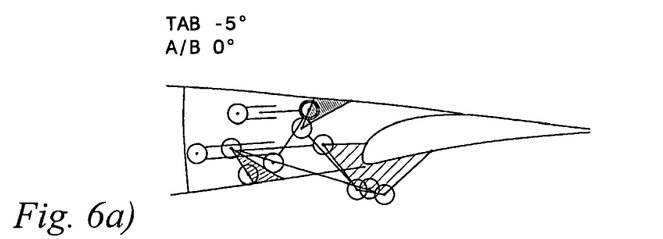
FIGS. 6a) to e), respective schematic representations of the inventive trailing edge control surface with different adjustments of the flap, and FIGS. 7a) to c), respective schematic representations of the inventive trailing edge control surface with different adjustments of the upper sealing flap in its function as a brake flap.

FIGS. 6a) to e), which are discussed in greater detail further below, show that the flap 4 (the reference symbols were omitted in FIGS. 6a) to e) in order to provide a better overview; see the reference symbols in FIGS. 1 to 5) can be adjusted downward through positive flap value positions as well as upward through negative flap value positions. When the flap 4 is used as a control flap and adjusted between negative (FIG. 6b)) and low positive flap value positions (FIG. 6d)), the wing profile is closed on the upper side by a sealing flap 7 and on the underside by a ventilation flap 5. When the flap 4 is used as a lift-increasing flap and the flap 4 is adjusted between low positive flap value positions (FIG. 6d)) and high positive flap value positions (FIG. 6e)), it is proposed that the ventilation flap 5 releases an air flow from the underside of the wing 1 to the upper side of the flap 4 and the sealing flap 7 is retracted in order to form a predetermined gap and release an outflow of air from the upper side of the flap 4.

Since the mechanism of the advanced trailing edge control surface is somewhat unclear in the illustration of the entire advanced trailing edge control surface, the complete mechanism is divided into its four sub-mechanisms in FIGS. 2 to 5. The four sub-mechanisms consist of a flap guide mechanism, a lower ventilation flap mechanism, an upper sealing flap mechanism and a brake flap mechanism. These four mechanisms are illustrated in their entirety in FIG. 1.

Figure 2:
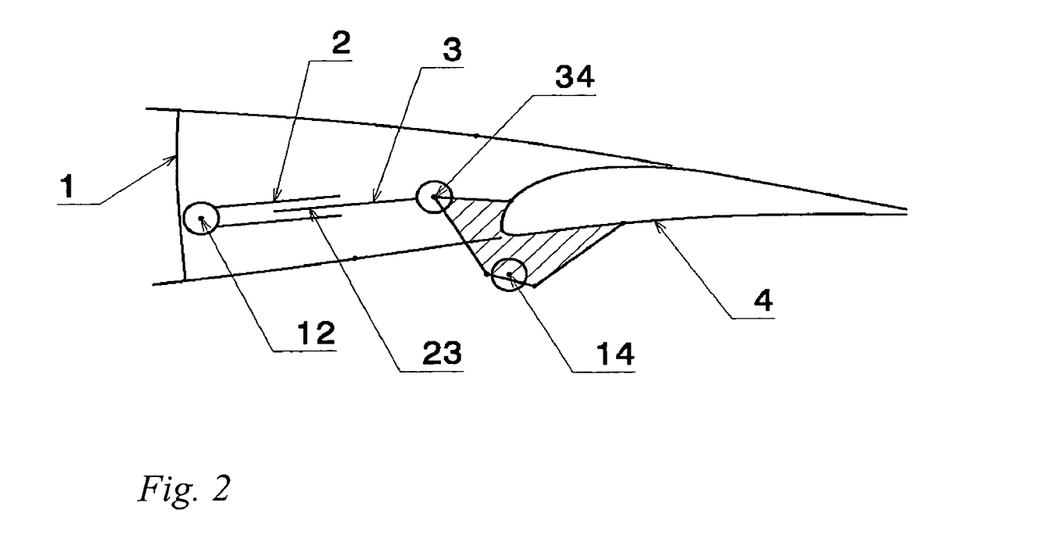
FIG. 2, a schematic sectioned side view of a flap guide mechanism contained in the advanced trailing edge control surface according to the embodiment of the invention.

The flap guide mechanism is illustrated separately in FIG. 2 and essentially consists of a simple hinged joint, i.e., only a hinge 14 is required that represents the connection between the wing 1 and the flap 4. With respect to kinematics, the wing 1 represents the stationary frame. The pivotal point 14 is positioned such that the flap 4 does not diverge from the wing profile contour at negative flap value positions, but the largest surface and curvature increase possible is still achieved at positive flap value positions of the flap 4.

The drive is realized by a linear prismatic joint 23 that is rotatably supported on the ends of the respective actuator element with the wing 1 and the flap 4. The actuator consists of the components 2 and 3 and may either be operated hydraulically (hydraulic actuator) or mechanically (spindle drive).

Figure 3:
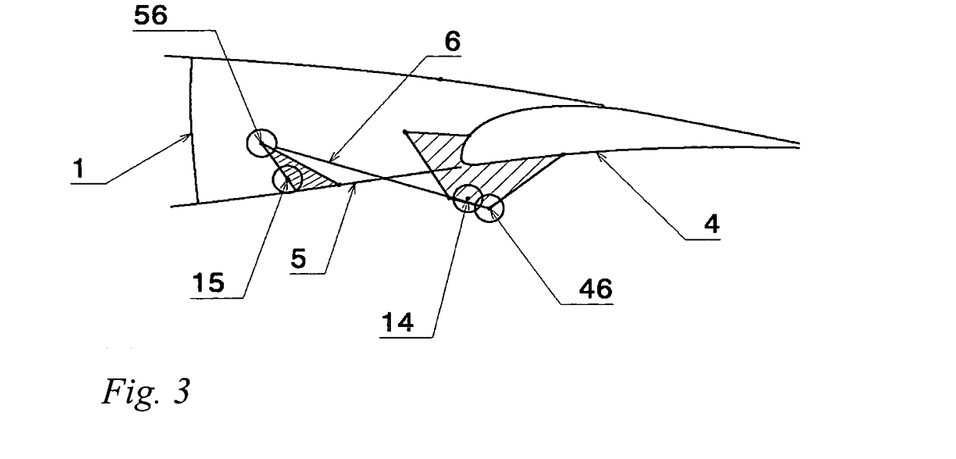
FIG. 3, a schematic sectioned side view of a lower ventilation flap mechanism contained in the advanced trailing edge control surface according to the embodiment of the invention.

The principle of the ventilation flap mechanism is schematically illustrated in FIG. 3. This figure shows the stationary wing 1 with the stationary bearings 15 and 14. The flap 4 and the ventilation flap 5 are connected to the wing 1. Although the function of the ventilation flap 5 was already explained above, it is briefly elucidated once again below. The function of the ventilation flap consists of allowing greater flap angles of the flap 4, see FIG. 6e), of realizing a sufficient flow of high-energy air around the flap 4 in order to increase the lift and of delaying the separation characteristics of the air flow.

The ventilation flap 5 is positively driven or mechanically gear-coupled with the flap 4, i.e., a defined functional dependence exists between these two elements. The mechanical coupling is realized by a simple rod 6. All bearings consist of simple hinges in the two-dimensional drawing, wherein these bearings may analogously consist of different joints in a three-dimensional embodiment, e.g., ball-and-socket joints with three degrees of rotational freedom. The mechanical principle remains the same in the three-dimensional space such that a two-dimensional illustration suffices. The joints 15, 14, 56 and 46 therefore consist of simple hinges in the two-dimensional drawing. This means that the entire geared coupling is realized with the simplest conceivable mechanism (four-bar mechanism).

Figure 6B:
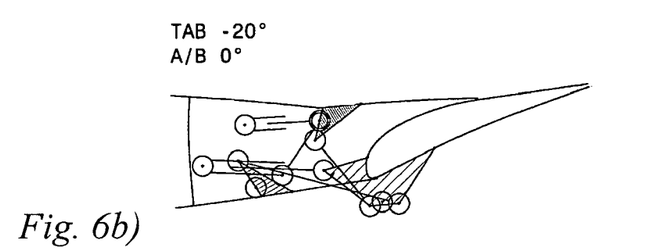
Figure 6C:
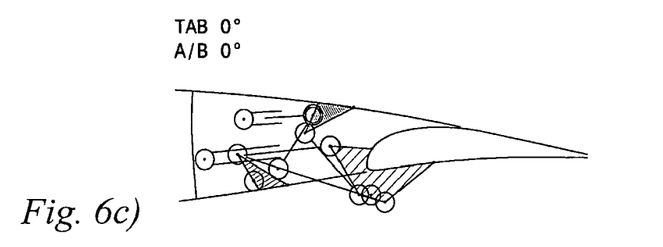
Figure 6D:
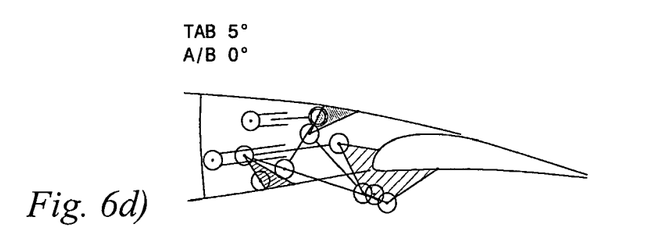
Figure 6E:
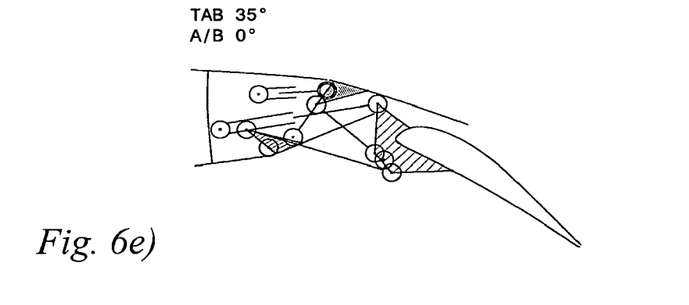

At higher positive flap angles of the flap 4, see FIG. 6e), the lower ventilation flap 5 opens in the direction of the wing contour to the predetermined opening angle. The dimensions of the ventilation flap 5 and the opening angle are defined by the aerodynamic marginal conditions (maximum lift, lowest aerodynamic drag, lowest noise emissions, etc.).

At lower positive and all negative flap angles of the flap 4, the ventilation flap 5 remains almost in its nominal position.

In this case, the nominal position is characterized by the profile contour while cruising. This means that a "quasi" state of rest is achieved in the range between low positive and high negative flap value positions of the flap 4 due two an advantageous technical design of the transmitting gear (the aforementioned four-bar mechanism). In addition, a complete seal of the ventilation flap relative to the flap 4 is ensured in the range between low positive and high negative flap value positions of the flap 4 such that the profile contour always remains favorable with respect to the air flow (low aerodynamic drag) and detrimental sources of noise in the form of edges, abrupt profile contour changes or down-draught areas are prevented.

Figure 4:
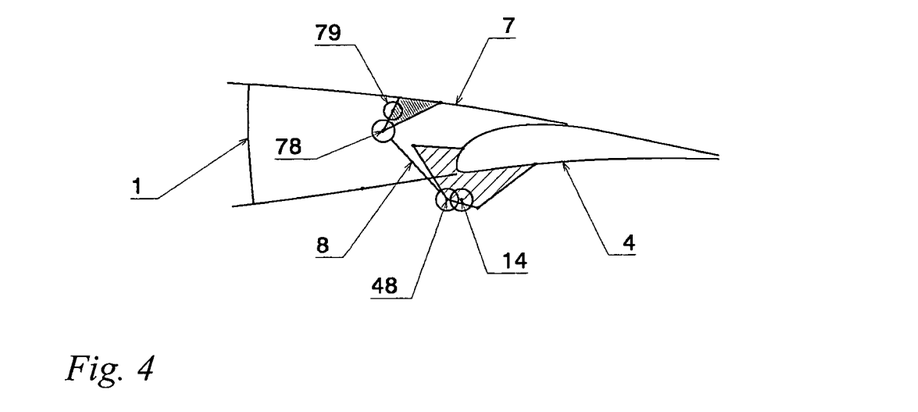
FIG. 4, a schematic sectioned side view of an upper sealing flap mechanism contained in the advanced trailing edge control surface according to the embodiment of the invention.

The principle of the sealing flap mechanism is schematically illustrated in FIG. 4. This figure shows the stationary wing 1 with the stationary bearing 14. The flap 4 is connected to the wing 1. A bearing 79 is only stationary relative to the wing 1 if the upper sealing flap 7 does not fulfill the brake flap function. The bearing 79 and another bearing 910 (see FIG. 5) are situated on a common pivoting axis such that a double hinge of sorts is formed in this case. In order to better understand this aspect of the invention, it is initially assumed that the bearing 79 is stationary relative to the wing 1.

The functions of the upper sealing flap 7 are described in detail below. Due to the requirement of allowing negative flap value positions of the flap 4, it becomes necessary to raise the upper wing contour or the brake flaps that are normally situated at this position on commercial aircraft so as to prevent a collision between the sealing flap 7 (the sealing flap 7 simultaneously forms the brake flap, see explanations below) and the flap 4.

Between lower positive flap angles, see FIG. 6*d*), and all negative flap angles of the flap 4, see FIG. 6*b*), no collision must occur between the flap 4 and the sealing flap 7, wherein the flap 4 and the sealing flap 7 need to remain sealed over the entire aforementioned range in order to maintain the aerodynamic drag as low as possible.

At higher positive flap value positions of the flap 4, see FIG. 6*e*), in which the flap 4 should act as a lift-increasing component, a convergent aerodynamic gap is always required. Consequently, the upper sealing flap 7 is lowered (pivoted about the bearing 79) at higher positive flap value positions of the flap 4, see FIG. 6*e*), in order to maintain the flow cross section convergent. In addition, the aerodynamic gap dimension between the trailing end of the sealing flap 7 and the profile contour of the flap 4 always needs to be exactly observed in this flap angle range. With respect to the required aerodynamic tolerances, this can currently not be realized with any known control such that a mechanical geared coupling is required between the flap 4 and the sealing flap 7, wherein this applies, in particular, to the landing position of the flap 4.

Since the simplest mechanical solution is once again favored for such a geared coupling, all aforementioned requirements are realized with an advantageous design of the aforementioned four-bar mechanism (bearings: 79, 78, 48, 14). A mechanical coupling rod 8 connects the sealing flap 7 and the flap 4.

The operation of the brake flap mechanism is almost completely decoupled from the flap mechanism, wherein a functional dependence only exists between the absolute brake flap value position of the upper sealing flap 7 (referred to the stationary wing 1) and the flap value position angle of the flap 4, and wherein this functional dependence is taken into account by a corresponding control in the flight control computer. This control does not affect the sealing flap mechanism (except in case of a defect) because the aerodynamic gap dimension is eliminated in the brake flap mode such that a corresponding loss of lift occurs and the aerodynamic drag is increased.

The normal brake flap functions therefore can still be realized with an additional drive (element 10 and element 11) without impairing the function of the above-mentioned mechanism of the lower panel (ventilation flap) 5 and the upper panel (sealing flap) 7. The typical brake flap acts, among other things, as an air brake, as a lift eliminator, as a roll control and as a wing alleviation.

FIG. 5 shows the additional kinematic elements that make it possible to realize the brake flap function of the upper sealing flap 7. Consequently, the upper sealing flap also acts as a brake flap. In addition, the brake flap function is actuated by a separate drive. The actuator device consists of the components 10 (actuator) and 11 (actuator rod) and may be operated hydraulically (hydraulic actuator) or mechanically (spindle drive). The actuator device for the brake flap function moves the element 9 on a circular path about a bearing 19 by the bearing 910. The movement of the element 9 on the circular path causes the double hinge 79 to also move along this circular path. The sealing flap (if active as a brake flap) therefore moves on the connecting rod of the four-bar mechanism 48, 78, 79 and 19. The bearing 19 is advantageously positioned such that no collision with the wing 1 occurs.

If so required, the brake flap mechanism could also be realized separately rather than being integrated into the kinematic system, wherein this would be conceivable in the form of an aileron in the outer wing region.

At negative flap value positions and low positive flap value positions of the flap 4, the wing profile contour is completely sealed (by the lower ventilation flap 5 and the upper sealing flap 7 and favorable with respect to the air flow such that an advantageous coefficient of drag is achieved and no vortices are generated that could also contribute to the noise emission (see FIGS. 6*a*) to *e*): TAB −20°, A/B 0°; TAB −5°, A/B 0°; TAB 0°, A/B 0; TAB 5°, A/B 0°).

The aerodynamic flap gap is exactly maintained by a mechanical geared coupling with the flap 4 such that no complex control circuit is required for maintaining the flap gap (aerodynamic air gap tolerances). These functions are realized solely with the actuator for the flap 4 (actuator body 2 and actuator rod 3). At higher positive flap angles of the flap 4, the lower ventilation flap 5 pivots into the wing profile contour and the advantageous air flow around the flap 4 is achieved. Beginning at higher flap angles of the flap 4, the upper sealing flap 7 no longer acts as a seal, but rather needs to exactly maintain the aerodynamic flow convergence and the aerodynamic gap dimension, see FIG. 6*e*): TAB 35°, A/B 0°).

Aerodynamic fairings (fairings) are provided in the regions in which the lower ventilation flap 5 is penetrated by the coupling rods 6 and 8 and in which support structures extend toward the wing 1, respectively.

The inventive trailing edge control surface makes it possible to realize a primary as well as a secondary flight control. In other words, high adjusting speeds for primary control surfaces can be achieved.

The inventive trailing edge control surface may act as an adaptive wing, wherein the most economically favorable operating point can be adjusted for the respective altitude (density, temperature, etc.), load status and cruising speed in the form of low positive or negative stationary flap value positions. The wing profile contour remains closed for low positive flap value positions and all negative flap value positions (except in the brake flap mode) and the profile contour remains aerodynamically favorable. In conventional secondary high-lift systems, this would usually not be possible because negative flap value positions could not be realized.

Figure 7A:
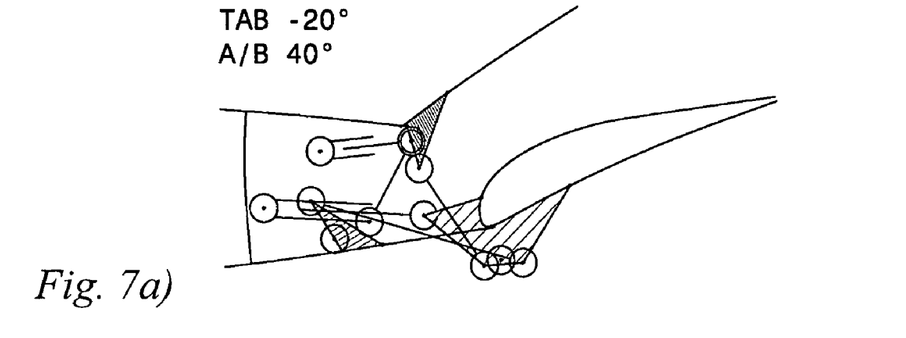
Figure 7B:
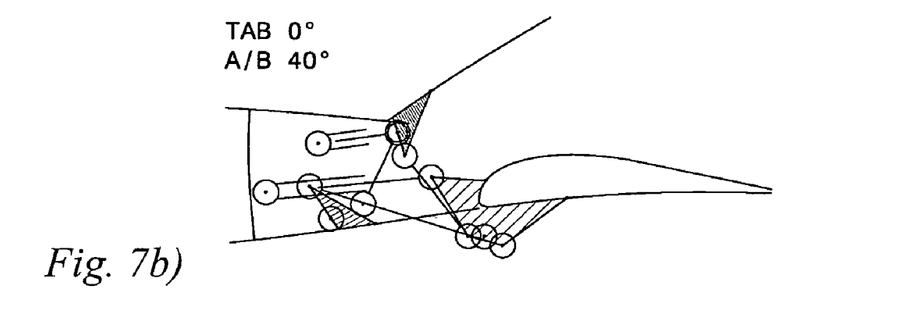
Figure 7C:
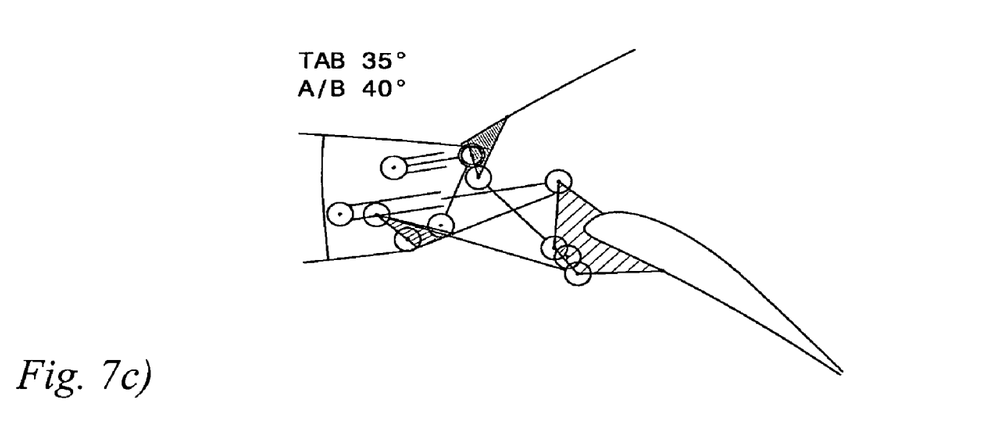

The brake flap mode of the upper sealing flap 7 that acts as brake flap in this case is illustrated in different configurations in FIGS. 7a) to c) in order to better understand this mode (TAB −20°, A/B 40°; TAB 0°, A/B 40; TAB 35°, A/B 40°).

It should be additionally noted that "comprising" does not exclude any other elements or steps and "a" or "an" does not exclude a plurality. It should furthermore be noted that characteristics or steps that were described with reference to one of the above embodiments can also be used in combination with other characteristics or steps of other above-described embodiments. The reference symbols in the claims should not be interpreted in a restrictive sense.

LIST OF REFERENCE SYMBOLS

1 Wing
2 Actuator body
3 Actuator rod
4 Flap
5 Ventilation flap
6 Rod
7 Sealing flap
8 Connecting rod
9 Connecting rod
10 Actuator rod
11 Actuator body
12 Stationary bearing
14 Stationary bearing
15 Stationary bearing
19 Bearing
23 Connecting rod
34 Bearing
46 Hinge
48 Second bearing
56 Hinge
78 Third bearing
79 Forth bearing
111 Stationary bearing, hinge
910 Bearing
1011 Connecting rod

The invention claimed is:

1. An advanced trailing edge control surface on the wing of an aircraft, with a wing, comprising:
   a flap arranged on the trailing edge of the wing, and extending in the wingspan direction and configured to be adjusted to a plurality of flap value positions,
   a pivoted sealing flap arranged on the upper side between the wing and the flap, and
   a pivoted movable ventilation flap arranged on the underside between the wing and the flap,
   wherein the flap is configured to be adjusted downward through positive flap value positions as well as upward through negative flap value positions,
   wherein the wing profile is closed on the upper side by the sealing flap and on the underside by the ventilation flap when the flap is used as a control flap and adjusted between negative and low positive flap value positions, and
   wherein the ventilation flap is configured to release an air flow from the underside of the wing to the upper side of the flap and the sealing flap is configured to be retracted to form a predetermined gap and to release an outflow of air from the upper side of the flap when the flap is used for increasing the lift and the flap is adjusted between low positive and high positive flap value positions, and
   wherein the trailing end of the sealing flap is configured to be activated independently from the flap to be pivoted upward to utilize the sealing flap as a brake flap.

2. The advanced trailing edge control surface of claim 1, wherein the sealing flap is positively driven by the flap.

3. The advanced trailing edge control surface of claim 1, further comprising a flap guide mechanism comprising a first hinge arranged between the wing and the flap.

4. The advanced trailing edge control surface of claim 1, wherein the pivotal point of the hinge is positioned such that the flap does not diverge from the wing profile contour in negative flap value positions of the flap and a significant surface increase and curvature increase is achieved in positive flap value positions of the flap.

5. The advanced trailing edge control surface of claim 1, further comprising a drive for prismatic joint coupled to the wing and to the flap.

6. The advanced trailing edge control surface of claim 5, wherein the prismatic joint comprises an actuator.

7. The advanced trailing edge control surface of claim 6, wherein the actuator is configured to be operated hydraulically or mechanically.

8. The advanced trailing edge control surface of claims 1, wherein the ventilation flap is configured to be positively driven by or mechanically gear-coupled with the flap.

9. The advanced trailing edge control surface of claim 8, further comprising a ventilation flap mechanism connected to the wing by a lever mechanism that is supported on first and second stationary bearings and comprising first and second levers.

10. The advanced trailing edge control surface of claim 1, further comprising a sealing flap mechanism configured to be positively driven by the flap.

11. The advanced trailing edge control surface of claim 10, wherein the sealing flap of the sealing flap mechanism is configured to be positively driven by the flap by a lever mechanism coupled to the flap at a second bearing near a third stationary bearing and to the sealing flap by a third bearing near a fourth bearing.

12. The advanced trailing edge control surface of claim 11, wherein the lever mechanism connecting the sealing flap to the flap and comprising a coupling rod forms a four-bar mechanism.

13. The advanced trailing edge control surface of claim 11, wherein the fourth bearing is configured to participate in a movement of the sealing flap in the sense of a brake flap function.

14. The advanced trailing edge control surface of claim 12, further comprising a fifth bearing on the upper sealing flap and coupled to an actuator to actuate the sealing flap in the sense of a brake flap function.

15. The advanced trailing edge control surface of claim 14, wherein the fifth bearing is arranged on a common pivoting axis with the fourth bearing.

16. The advanced trailing edge control surface of claim 10, wherein the sealing flap mechanism is configured such that a collision between the flap and the sealing flap is prevented between low positive flap angles and all negative flap angles of the flap and the sealing flap is sealed relative to the flap in the entire aforementioned range.

17. The advanced trailing edge control surface of claim 16, wherein the upper sealing flap is configured to be lowered to produce a convergent aerodynamic gap by being turned about the fourth bearing at higher positive flap value positions of the flap, in which the flap acts as a lift-increasing component.

18. The advanced trailing edge control surface of claim 10, wherein a functional dependence between the absolute brake flap value position of the upper sealing flap and the flap value position angle of the flap is realized by a corresponding control in the flight control computer.

19. The advanced trailing edge control surface of claim 10, further comprising an actuator device provided for the brake flap function and configured to move an element along a circular path about a bearing by the fifth bearing such that the double hinge formed by the fourth hinge and a second hinge also moves along this circular path.

20. The advanced trailing edge control surface of claim 10, wherein the brake flap mechanism is largely decoupled from the upper sealing mechanism.

21. The advanced trailing edge control surface of claim 10, wherein the brake flap mechanism is configured separately rather than being integrated into the kinematic system.

22. The advanced trailing edge control surface of claim 1, wherein all bearings consist of simple hinges.

23. The advanced trailing edge control surface of claim 1, wherein the construction essentially consists of rods and frameworks only.

24. The advanced trailing edge control surface of claim 1, wherein three-dimensional kinematics are provided for a cylindrical movement of the flap.

25. The advanced trailing edge control surface of claim 1, wherein three-dimensional kinematics are provided for a conical movement of the flap.

26. The advanced trailing edge control surface of claim 1, wherein the advanced trailing edge control surface serves as primary control surface.

27. The advanced trailing edge control surface of claim 1, wherein the advanced trailing edge control surface serves as secondary control surface.

28. The advanced trailing edge control surface of claim 1, wherein the advanced trailing edge control surface serves as adaptive wing component.

29. The advanced trailing edge control surface of claim 1, wherein the advanced trailing edge control surface is used on the trailing wing edge of a commercial aircraft or a transport aircraft.

* * * * *

UNITED STATES PATENT AND TRADEMARK OFFICE
CERTIFICATE OF CORRECTION

| | | |
|---|---|---|
| PATENT NO. | : 8,336,829 B2 | Page 1 of 1 |
| APPLICATION NO. | : 11/992495 | |
| DATED | : December 25, 2012 | |
| INVENTOR(S) | : Daniel Reckzeh et al. | |

It is certified that error appears in the above-identified patent and that said Letters Patent is hereby corrected as shown below:

In the Claims

Column 10, line 16, after "drive for" insert -- a flap guide mechanism, the drive comprising a linear --.
Column 10, line 28, after "mechanism" delete "that is".

Signed and Sealed this
First Day of September, 2015

Michelle K. Lee
*Director of the United States Patent and Trademark Office*